United States Patent

Marjanski et al.

[11] Patent Number: 5,669,627
[45] Date of Patent: Sep. 23, 1997

[54] SIDE IMPACT AIRBAG MODULE WITH EXTRUDED COVER

[75] Inventors: George C. Marjanski, Riverdale; Davin G. Saderholm, Salt Lake City; Donald J. Paxton, Brigham City; David L. Spilker, Pleasant View; Brent R. Beesley, Layton, all of Utah

[73] Assignee: Morton International, Inc., Chicago, Ill.

[21] Appl. No.: 690,324

[22] Filed: Jul. 25, 1996

[51] Int. Cl.$^6$ ........................................... B60R 21/20
[52] U.S. Cl. ................... 280/728.3; 280/728.2; 280/730.2; 280/732
[58] Field of Search ................ 280/728.1, 728.2, 280/728.3, 730.2, 732

[56] References Cited

U.S. PATENT DOCUMENTS

| | | | |
|---|---|---|---|
| 5,062,664 | 11/1991 | Bishop et al. | 280/732 |
| 5,425,550 | 6/1995 | Paxton et al. | 280/728.3 |
| 5,431,436 | 7/1995 | Mossi et al. | 280/732 |
| 5,474,325 | 12/1995 | Daines et al. | 280/728.3 |
| 5,498,030 | 3/1996 | Hill et al. | 280/728.1 |
| 5,527,062 | 6/1996 | Kreuzer | 280/732 |

*Primary Examiner*—Eric D. Culbreth
*Attorney, Agent, or Firm*—George W. Rauchfuss, Jr.; Gerald K. White

[57] ABSTRACT

A side impact airbag module including an inflator and a folded airbag is formed into a module by means of an extruded cover. The cover encircles the inflator and airbag and incorporates structure for releasing the airbag upon inflation. Optional end caps may be attached to one or both ends of the module.

16 Claims, 1 Drawing Sheet

5,669,627

SIDE IMPACT AIRBAG MODULE WITH EXTRUDED COVER

TECHNICAL FIELD

This invention relates to motor vehicle airbags. More particularly, it relates to a side impact airbag module which may be installed during automobile assembly.

BACKGROUND ART

Side impact airbags are becoming more and more common in the automotive industry. Driver and passenger side airbags for protection in the event of head-on type collisions have had a long and successful tenure. However, they do not provide protection against impacts coming from other directions (as used herein "side impact" refers to impacts from any direction other than straight ahead). Problems arise, however, in mounting side impact modules within the vehicle. In one prior art arrangement, a side impact module is mounted within the structure of the automobile seat behind the foam and seat cover. This requires the seat manufacturer to change its seat manufacturing process to permit installation of the module.

Another problem is that it would be desirable to have a module which can be easily varied in length. This would permit the use of various sized inflators and would be adaptable to varying vehicle dimensions. Accordingly, it is a primary object of the present invention to provide a side impact airbag module which can be easily varied in length and which may be externally attached to vehicle seats or structural portions. The manner in which these objects are achieved will be apparent from the following description and appended claims.

DISCLOSURE OF INVENTION

The invention comprises an extruded plastic module cover which may be cut to any desired length. The cover encircles the inflator and folded airbag. Means are provided on the cover for releasing the airbag upon inflation.

BEST MODE FOR CARRYING OUT THE INVENTION

Figure 2:
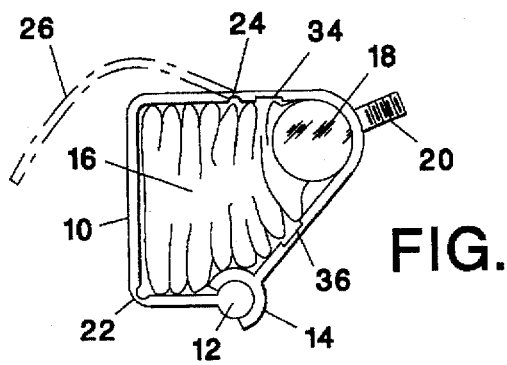
FIG. 2 is a top view of the module of FIG. 1.
Figure 1:
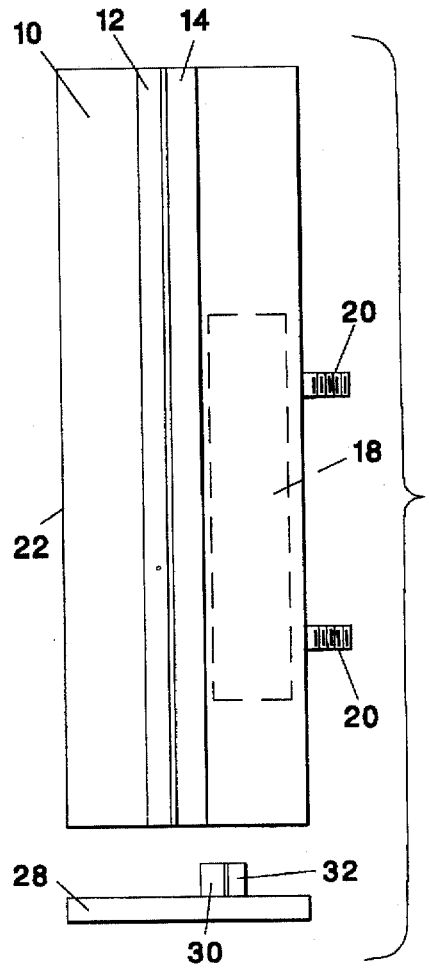
FIG. 1 is an exploded side view of an airbag module in accordance with this invention and an optional end cap.

FIGS. 1 and 2 illustrate one embodiment of the current invention. The basic feature of the invention resides in the use of an extruded material such as thermoplastic resin which is cut to the proper length and encircles an inflator and its folded airbag. In the embodiment of FIGS. 1 and 2 the plastic cover 10 is extruded basically in the form of a sheet having opposite longitudinal edges. One edge carries a bead 12 while the other carries a semi-cylindrical socket 14. The extruded sheet is then cut to the desired length. The cover 10 encircles a folded airbag 16 which has an open mouth connected to receive the gas from a conventional, substantially cylindrical inflator 18 which has a pair of mounting studs 20. The cover 10 is provided with holes (not shown), such as by punching out appropriate spots in the extruded sheet, which receive the mounting studs 20 therethrough. The bead 12 along one edge of the cover snaps into the socket 14 on the other edge of the cover so as to form an encircling tube. In the FIGS. 1 and 2 embodiment, the cover 10 is thinned and thereby weakened to form a longitudinal tear seam 22 parallel to, and intermediate to, the opposite longitudinal edges of the sheet. A second portion of the cover 10, parallel to and spaced apart from tear seam 22, is slightly thinned and thereby weakened to form a hinge region 24.

The assembled airbag module of FIGS. 1 and 2 is mounted in a desired location within the vehicle by means of the threaded studs 20. One such location, for example, could be on the exterior of an automobile seat. The seat manufacturer would only need to provide an access slot on the outer surface of the seat and a corresponding slot on the seat's structural framework.

In operation of the FIGS. 1 and 2 embodiment of the invention, the occurrence of a sufficiently severe impact will actuate the inflator 18 in the usual manner causing the airbag 16 to begin to inflate. The inflationary force of the airbag will rupture the tear seam 22 along its length thereby creating a door 26 which rotates around the hinge region 24 permitting release of the airbag.

For aesthetic or protective reasons, it may be desired to close the ends of the airbag module by means of one or more molded end caps. FIG. 1 illustrates one molded end cap 28. One means of attaching such an end cap is to employ integral clips 30, 32 which are received in channels 34, 36 formed in the stationary side of the cover 10 during the extrusion process.

Figure 3:
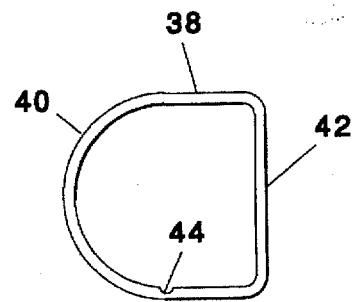
FIG. 3 is a view similar to FIG. 2 of a modified cover.
Figure 4:
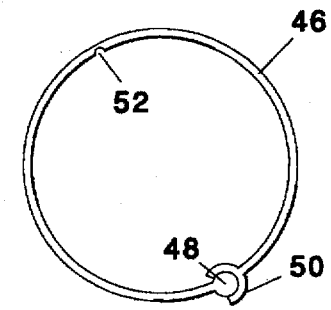
FIG. 4 is a view similar to FIGS. 2 and 3 of a still further modified cover.
Figure 5:
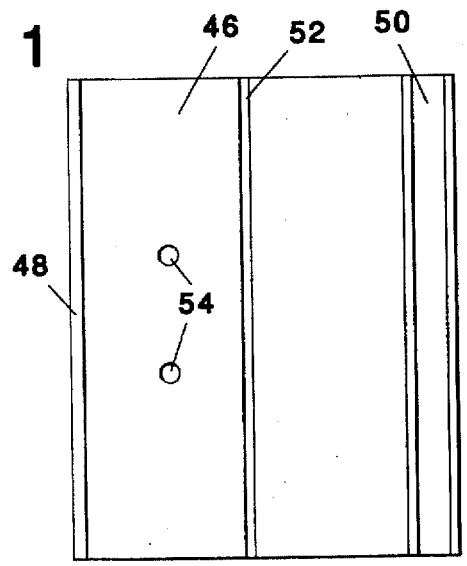
FIG. 5 is a layout on a reduced scale of the sheet which forms the cover of FIG. 4.

Two potential cover modifications are illustrated in FIGS. 3–5. For the sake of simplicity, the inflator and airbag are not illustrated. The FIG. 3 modification comprises a cover in the form of an extruded tube 38 which would normally receive the cylindrical inflator along its semi-cylindrical side 40. A somewhat more planar side 42 would lie adjacent the airbag. A weakened tear seam 44 extends longitudinally the length of the cover and is designed to rupture in the usual manner upon expansion of the airbag.

A further modification is illustrated in FIG. 4. In this modification, the cover 46 is extruded as a substantially flat sheet as illustrated in FIG. 5. One edge of the sheet cover 46 carries a bead 48 and the opposite edge carries a socket 50. The bead and socket are similar to those illustrated in FIGS. 1 and 2 with the exception that they are designed to part more easily. Substantially intermediate the two edges of the cover 46 is a weakened longitudinal hinge region 52. The sheet cover 46, after being cut to the desired length, is wrapped around the inflator and airbag in essentially the same manner, holes 54 being provided to receive the inflator studs 20. The bead 48 is inserted into the socket 50 to form the tubular structure as illustrated in FIG. 4. Upon actuation of the inflator the airbag begins to inflate and the resulting force causes the bead 48 to separate from the socket 50 thereby opening the module and releasing the airbag.

The present invention allows for a side impact airbag module which is variable in length and low in cost. It does not require either external attachment means on the vehicle seat or a change of the contour of the seat to receive the module. Molded end caps may be optionally employed in any of the illustrated modifications.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. The method of manufacturing a side impact airbag module which comprises:

providing an inflator having means thereon for mounting to a vehicular frame member;

providing a folded airbag having an open mouth;

connecting the mouth of said airbag to said inflator for inflation upon actuation of said inflator;

providing an extruded one-piece thermoplastic cover in the form of a sheet, said extruded sheet having first and second longitudinal edges to form a tube adapted to encircle said airbag and inflator the extruded sheet defining a weakened tear seam parallel to and intermediate said first and second longitudinal edges for releasing said airbag upon inflation;

cutting said sheet to a desired length sufficient to enclose said inflator and said airbag; and encircling said inflator and airbag with said cut sheet and interlocking said first edge with said second edge to encircle said airbag and inflator to form an elongated airbag module.

2. The method of claim 1 wherein said interlocking of said first edge with said second edge comprises receiving a bead carried by the first longitudinal edge in a socket carried by said second longitudinal edge.

3. A side impact airbag module for an automotive vehicle which comprises:

a substantially cylindrical inflator;

a folded airbag having an open mouth connected to receive inflation gas from said inflator; and an extruded one-piece thermoplastic cover encircling said inflator and folded airbag, said cover comprises an extruded sheet having first and second longitudinal edges to form a tube, the cover defining a weakened tear seam parallel to and intermediate to said first and second longitudinal edges for releasing said airbag upon inflation.

4. The airbag module of claim 3 additionally comprises a weakened hinge region spaced from, and parallel to, said tear seam to form therewith an airbag releasing door.

5. The airbag module of claim 4 additionally comprising an end cap closing at least one end of said encircling cover.

6. The airbag module of claim 5 wherein said cover defines extruded channels and said end cap carries clips extending into said channels.

7. A side impact airbag module for an automotive vehicle which comprises:

a substantially cylindrical inflator;

a folded airbag having an open mouth connected to receive inflation gas from said inflator;

an extruded one-piece thermoplastic cover encircling said inflator and airbag, said cover including means for releasing said airbag upon inflation, the cover additionally comprising an end cap closing at least one end of said encircling cover; and wherein said cover defines extruded channels and said end cap carries clips extending into said channels.

8. The airbag module of claim 7 wherein said cover is an extruded tube and said releasing means comprises a weakened tear seam extending along the length of said tube.

9. The airbag module of claim 7 wherein said cover comprises an extruded sheet having opposed first and second longitudinal edges and means joining said first and second longitudinal edges to form a tube.

10. The airbag module of claim 9 wherein said joining means comprises:

a bead carried by said first longitudinal edge, and a socket carried by said second longitudinal edge receiving said bead.

11. The airbag module of claim 10 wherein said means for releasing said airbag upon inflation comprises a weakened tear seam parallel to and intermediate to said first and second longitudinal edges.

12. The airbag module of claim 11 wherein said cover additionally comprises a weakened hinge region spaced from, and parallel to, said tear seam to form therewith an airbag releasing door.

13. The airbag module of claim 9 wherein said means for releasing said airbag upon inflation comprises a weakened tear seam parallel to and intermediate to said first and second longitudinal edges.

14. The airbag module of claim 13 wherein said cover additionally comprises a weakened hinge region spaced from, and parallel to, said tear seam to form therewith an airbag releasing door.

15. The airbag module of claim 14 wherein said means joining said first and second longitudinal edges to form a tube comprise a bead carried by the first longitudinal edge, and a socket carried by said second longitudinal edge receiving said bead.

16. A side impact airbag module for an automotive vehicle which comprises:

a substantially cylindrical inflator;

a folded airbag having an open mouth connected to receive inflation gas from said inflator; and an extruded one-piece thermoplastic cover completely encircling said inflator and airbag, wherein said cover comprises an extruded sheet having opposed first and second longitudinal edges, a bead carried by the first longitudinal edge and a socket carried by the second longitudinal edge and receiving said bead, said sheet defining a weakened tear seam intermediate to and parallel to said opposed first and second longitudinal edges, said cover also defining a thinned hinged region parallel to and spaced apart from the tear seam intermediate the tear seam and one of the opposed longitudinal edges of the extruded sheet, said tear seam being rupturable by inflationary force, upon inflation of the folded airbag, creating a door rotatable around the hinge region for release of the airbag.

* * * * *